US006883368B2

(12) United States Patent
Smith et al.

(10) Patent No.: US 6,883,368 B2
(45) Date of Patent: Apr. 26, 2005

(54) METHOD AND APPARATUS FOR CHARACTERIZING THE MICROWAVINESS OF A DISK SURFACE

(75) Inventors: Gordon James Smith, deceased, late of Rochester, MN (US); by Molly Smith, legal representative, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 318 days.

(21) Appl. No.: 10/124,897

(22) Filed: Apr. 18, 2002

(65) Prior Publication Data

US 2003/0204347 A1 Oct. 30, 2003

(51) Int. Cl.⁷ .................................................. G01B 5/28
(52) U.S. Cl. ........................................................ 73/105
(58) Field of Search .............................. 73/105; 374/45

(56) References Cited

U.S. PATENT DOCUMENTS

| | | | | | |
|---|---|---|---|---|---|
| 4,468,136 A | * | 8/1984 | Murphy et al. | ................ | 374/45 |
| 5,527,110 A | * | 6/1996 | Abraham et al. | .............. | 374/5 |
| 5,696,383 A | * | 12/1997 | Cheng | ................... | 250/559.22 |
| 5,739,972 A | | 4/1998 | Smith et al. | ............. | 360/77.03 |
| 5,741,070 A | * | 4/1998 | Moslehi | ....................... | 374/161 |
| 5,751,510 A | | 5/1998 | Smith et al. | .................. | 360/67 |
| 5,808,184 A | * | 9/1998 | Boutaghou et al. | ........... | 73/105 |
| 5,872,311 A | * | 2/1999 | Schaenzer et al. | ............ | 73/105 |
| 5,901,001 A | * | 5/1999 | Meyer et al. | .................. | 360/25 |
| 6,071,007 A | * | 6/2000 | Schaenzer et al. | ............. | 374/7 |
| 6,195,219 B1 | | 2/2001 | Smith | ......................... | 360/66 |
| 6,196,062 B1 | * | 3/2001 | Wright et al. | ................. | 73/105 |
| 6,239,936 B1 | | 5/2001 | Abraham et al. | ............ | 360/75 |
| 6,262,572 B1 | * | 7/2001 | Franco et al. | ............... | 324/212 |
| 6,494,085 B2 | * | 12/2002 | Wakefield et al. | ........... | 73/105 |
| 6,619,105 B1 | * | 9/2003 | Yao et al. | ..................... | 73/105 |

FOREIGN PATENT DOCUMENTS

EP          242597 A   * 10/1987   ............ G11B/5/54

* cited by examiner

*Primary Examiner*—Hezron Williams
*Assistant Examiner*—John Fitzgerald
(74) *Attorney, Agent, or Firm*—Bracewell & Patterson, L.L.P.

(57) ABSTRACT

The microwaviness (i.e., surface waviness for wavelengths on the order of the length of the transducing head) of a recording disk surface is measured during manufacture as a quality control process. Preferably, the disk is measured using an actuator-mounted thermal sensor, comprising an electrical resistance element driven with a constant current. At small distances, the disk surface acts as a heat sink and variation in this distance will be detected as a change in resistance of the sensor. Preferably the sensor is initially used to characterize the gross waviness of the surface, and the actuator then follows this gross waviness to measure surface variations in the microwaviness range.

13 Claims, 8 Drawing Sheets

METHOD AND APPARATUS FOR CHARACTERIZING THE MICROWAVINESS OF A DISK SURFACE

FIELD OF THE INVENTION

The present invention relates to disk drive data storage devices, and in particular, to the manufacture of disks for use in disk drive data storage devices.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modem computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

A disk drive typically contains one or more disks attached to a common rotating hub or spindle. Each disk is a thin, flat member having a central aperture for the spindle. Data is recorded on the flat surfaces of the disk, usually on both sides. A transducing head is positioned adjacent the surface of the spinning disk to read and write data. Increased density of data written on the disk surface requires that the transducer be positioned very close to the surface.

The disk is manufactured of a non-magnetic base (substrate), which is coated with a magnetic coating for recording data on the recording surfaces, and which may contain additional layers as well, such as a protective outer coating. Historically, aluminum has been the material of choice for the substrate. In recent years there has been considerable interest in other materials, specifically glass. Ideally, the disk surface is both very flat and very smooth. Deviation in the surface profile from an ideal plane can affect the flying characteristics of the transducer heads, can cause collision or damage to the heads, can affect the data recording characteristics, or have other consequences. Whether the disk substrate is manufactured of aluminum, glass or other material, it is subjected to multiple processing steps to ensure a sufficiently flat, smooth finished disk.

Of course, ideal planes exist only in mathematical theory, and it is impossible to make a physical device which is truly perfectly flat and smooth. Well-known problems of waviness and surface roughness exist. Waviness or warp is a gross deviation from flatness over the entire disk surface. Waviness is generally due to the fact that the disk is readily susceptible to warping as a result of its very thin, annular shape, and various internal stresses are introduced during formation or the many processing steps required to produce an acceptable finished product. A disk transducer head flies a small distance above the surface, and on a warped disk will tend to follow the warp, thus moving up and down as the disk spins under the head. The frequency of the is up and down motion is generally a small multiple (e.g. 2) of the frequency of disk revolution. If the warp is excessive, the head may not be able to follow the disk surface at the prescribed distance. Roughness, on the other is a local surface condition. Excessive roughness may affect the flyheight or the recording characteristics of the disk surface. A typical disk is subjected to one or more polishing steps to reduce roughness.

An intermediate form of surface deviation, herein referred to as "microwaviness", may exist. As used herein, microwaviness is a waviness of a disk surface for a range of wavelengths that are on the order of the length of the transducing head. Using current head technology, these wavelengths are approximately in the range of 10 to 5000 microns, it being understood that these ranges could change in the future if recording heads change significantly in size.

The significance of microwaviness has not necessarily been appreciated in the past. But as disk drive designs increasingly employ head flying heights closer to the disk surface, microwaviness becomes more significant. For low head flying heights, even small amplitude microwaviness can excite an airbearing resonance, thereby causing excessive head-disk spacing modulation. This modulation can cause poor overwriting of data on the disk surface, which can lead to hard read errors (unrecoverable read errors) as well as an increase in soft read errors (which degrades performance). In some cases, it may even cause collision of the head with the disk surface, potentially damaging the disk surface and/or head, and leading to permanent drive failure in the form of a head crash.

Although not necessarily recognized in the field, it would be desirable to measure the microwaviness characteristics of a disk surface before shipping the finished product to the customer, and preferably before assembling the disk into a disk drive storage device, in order to assure that manufactured disks or disk substrates have sufficiently low amplitude microwaviness so as not to cause problems in the field. Although it is possible to measure disk surface microwaviness using existing laboratory equipment, use of such in a manufacturing environment would be excessively cumbersome and expensive, or have other drawbacks, which would make routine application difficult or impractical. For example, sufficiently accurate measurement of disk surface microwaviness can be achieved with a laboratory instrument called a ZYGO™ optical measurement tool, but using this tool to measure manufactured disks would be impractically time consuming and expensive. A need exists for a faster, practical method of measuring disk microwaviness, and particularly one which could be applied as a spot-screening or an inspection process for disks in a manufacturing environment.

SUMMARY OF THE INVENTION

In accordance with one or more aspects of the present invention, the microwaviness of a disk surface is measured in a special test bed as part of a manufacturing process of the disk. A disks having excessive microwaviness are rejected before shipment to a customer, and preferably, before installing the disk in a disk drive storage device.

In the preferred embodiment, the disk is measured using a thermal sensor mounted on an actuator. The thermal sensor comprises an electrical resistance element which changes resistance with temperature. A constant current is driven through the resistance element, causing heating of the sensor. At small distances, the disk surface acts as a heat sink for the sensor. Variation in this distance will be detected as a change in resistance of the sensor.

Preferably the actuator on which the sensor is mounted has at least two degrees of freedom of motion relative to the disk surface: the z-axis (normal to the disk surface) and the r-axis (radial to the disk's axis of rotation). The disk is rotated under the actuator. The actuator is initially brought near the disk surface and senses the gross waviness of the surface, which it follows by moving up and down in the z-axis. Once a gross waviness pattern is determined and followed by the actuator, an appropriate actuator-to-disk spacing is selected and the sensor measures variations in distance to the surface in the microwaviness range. The sensor is moved in the r-axis to measure microwaviness at multiple radial positions on the disk surface.

In the preferred embodiment, the actuator used to measure microwaviness is integrated into a test bed fixture which may be used to simultaneously or concurrently perform other tests and inspections of the disk surface. In particular, it is preferred that it be integrated into a fixture which performs glide testing, i.e., a test for local surface asperities. However, it could alternatively be mounted in a separate test bed fixture which performs no other testing.

By using a simple characterization of microwaviness in accordance with the preferred embodiment of the present invention, potentially inferior disk surfaces can be detected long before field failures or other signs become apparent, costs of manufacture can be reduced, and quality control in a disk manufacturing line improved.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview of Disk Drive Design

Figure 1:
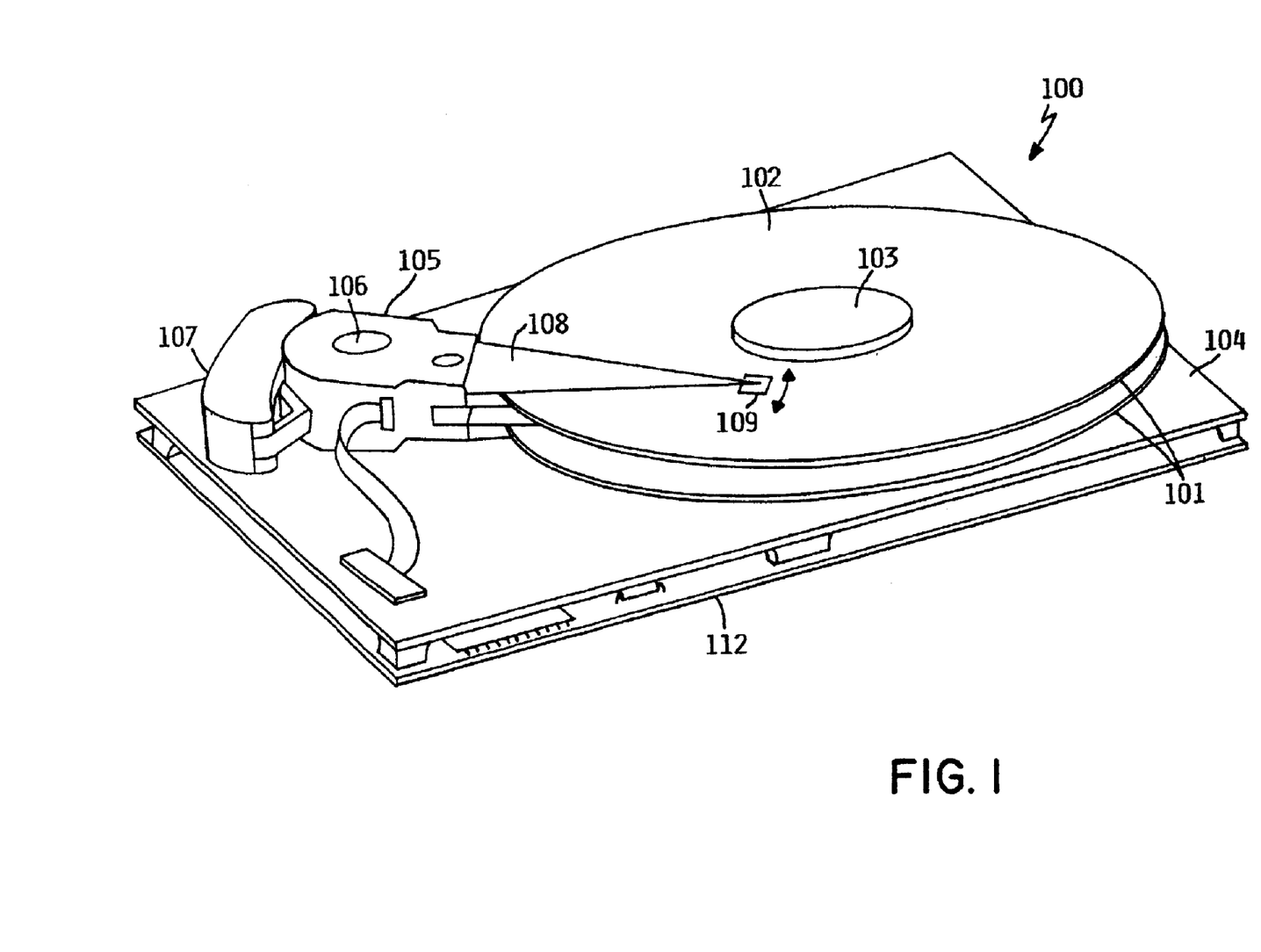
FIG. 1 is a simplified representation of a rotating magnetic disk drive storage device, in which disks as described herein are installed for use, according to the preferred embodiment of the present invention.

Referring to the Drawing, wherein like numbers denote like parts throughout the several views, FIG. 1 is a simplified drawing of the major components of a rotating magnetic disk drive storage device 100, in which disks as described herein are installed for use. Disk drive 100 typically contains one or more smooth, flat disks 101 which are permanently attached to a common spindle or hub 103 mounted to a base 104. Where more than one disk is used, the disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk 101 is formed of a solid disk-shaped base or substrate, having a hole in the center for the spindle. The substrate may be aluminum, glass, ceramic, or any other suitable material. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator 105 positions a transducer head 109 adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding a shaft or bearing 106 having comb-like arms extending toward the disk (which is, for this reason, sometimes referred to as the "comb"); a set of thin suspensions 108 attached to the arms, and an electromagnetic motor 107 on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electro-magnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo patterns identifying the data tracks are written on at least one disk surface. The transducer periodically reads the servo patterns to determine its current deviation from the desired radial position, and the feedback system adjusts the position of the actuator to minimize the deviation. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head 109 is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer, and therefore a smooth and even disk surface is required. Several different transducer designs are used. Many current disk drive designs employ a thin-film inductive write transducer element and a separate magneto-resistive read transducer element. The suspensions actually apply a force to the transducer heads in a direction into the disk surface. The aerodynamic characteristics of the slider counter this force, and enable the slider to fly above the disk surface at the appropriate distance for data access.

Various electrical components control the operation of disk drive 100, and are depicted mounted on circuit card 112 in FIG. 1, although they may be mounted on more than one circuit card, and the card or cards may be mounted differently.

It will be understood that FIG. 1 is intended as a simplified representation of a rotating magnetic disk drive, which is merely an example of a suitable environment for using a glass or ceramic disk substrate produced in accordance with the preferred embodiment. It does not necessarily represent the sole environment suitable for such a disk.

DETAILED DESCRIPTION

In accordance with the preferred embodiment of the present invention, the microwaviness of a recording surface of a disk suitable for use, e.g., in a rotating magnetic disk drive data storage device, is characterized as herein described. Preferably, the disk surface is characterized during the manufacturing process, and specifically, before installation of the disk into a rotating disk drive assembly, although it could alternatively be characterized after installation into the disk drive. Preferably, the disk surface is characterized after all finishing operations have been performed, though not necessarily before all inspection steps have been completed, i.e., the surfaces have been ground and polished, coating layer or layers have been applied, texturing, if any, has been performed, surface has been appropriately cleaned of process residues, etc. However, it would alternatively be possible to measure microwaviness at an intermediate stage, e.g., after the substrate has been polished and cleaned, but before application of the magnetizable layer. A disk which fails to meet some pre-established criterion, e.g., root-mean square (RMS) amplitude of microwaviness less than some value, is rejected and not assembled into a disk drive. Furthermore, characterization and possible rejection at an early stage facilitates various quality control processes, as the surface characteristics of disks can be continually monitored and any change quickly identified for possible remedial action.

Figure 2:
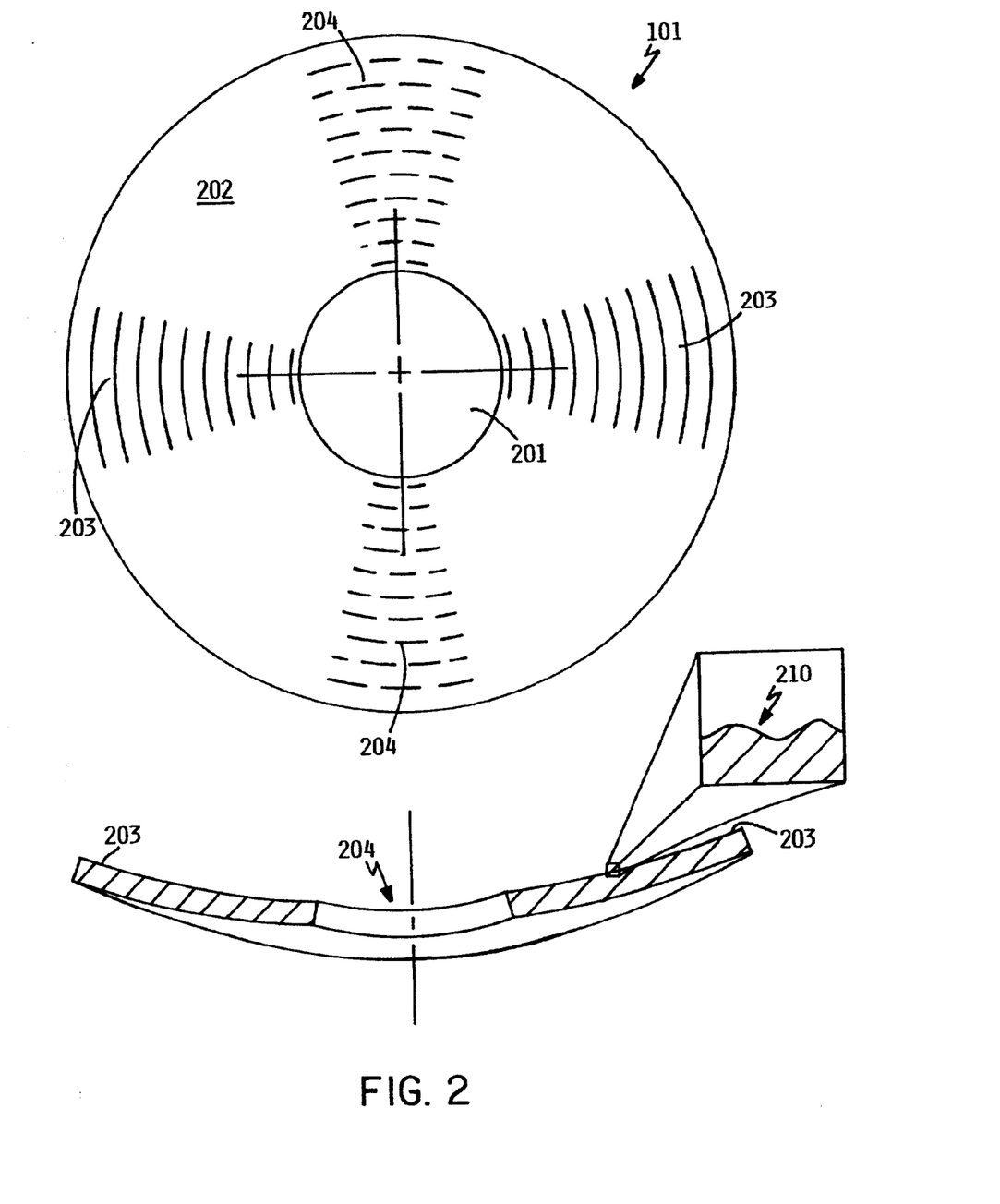
FIG. 2 shows top and cross sectional views of a recording disk, illustrating in greatly exaggerated fashion gross waviness or disk warp, and microwaviness of the recording surface.

FIG. 2 represents a recording disk 101, illustrating in greatly exaggerated fashion gross waviness or disk warp, and microwaviness of the recording surface. FIG. 2 contains a top view and a cross sectional view of the disk. The disk is a round, flat member with a central aperture 201 for placement of the spindle and motor. Ideally, the recording surface 202 is a perfectly flat plane. As shown in the cross-sectional view, however, the disk may be warped, producing high regions 203 and low regions 204 of the recording surface. In the finished disk assembly, a transducer head flying above this disk surface will generally follow the gross disk warp, rising with the high regions 203 and falling with the low regions 204 to maintain a constant distance from the recording surface, provided that the warp is not too extreme. Generally, there are only a small number (e.g. 2) of high and low regions on each disk surface, and so the transducer head rises and falls at a frequency which is a small multiple of the frequency of disk revolution. Microwaviness, on the other hand, is a much smaller waviness in the surface as shown at 210, in which the wavelength is on the order of the length of the transducing head, i.e., approximately 10 to 5000 microns, it being understood that these ranges could change in the future if recording heads change significantly in size. It will be understood that FIG. 2 is intended as an illustration of disk characteristics which is not necessarily to scale. In particular, the disk thickness is exaggerated with respect to the diameter; the amplitude of microwaviness is greatly exaggerated with respect to the wavelength; and the degree of warp shown is greatly exaggerated for illustrative purposes. In a typical disk, both the warp and the microwaviness will be undetectable by the unaided eye.

Figure 3:
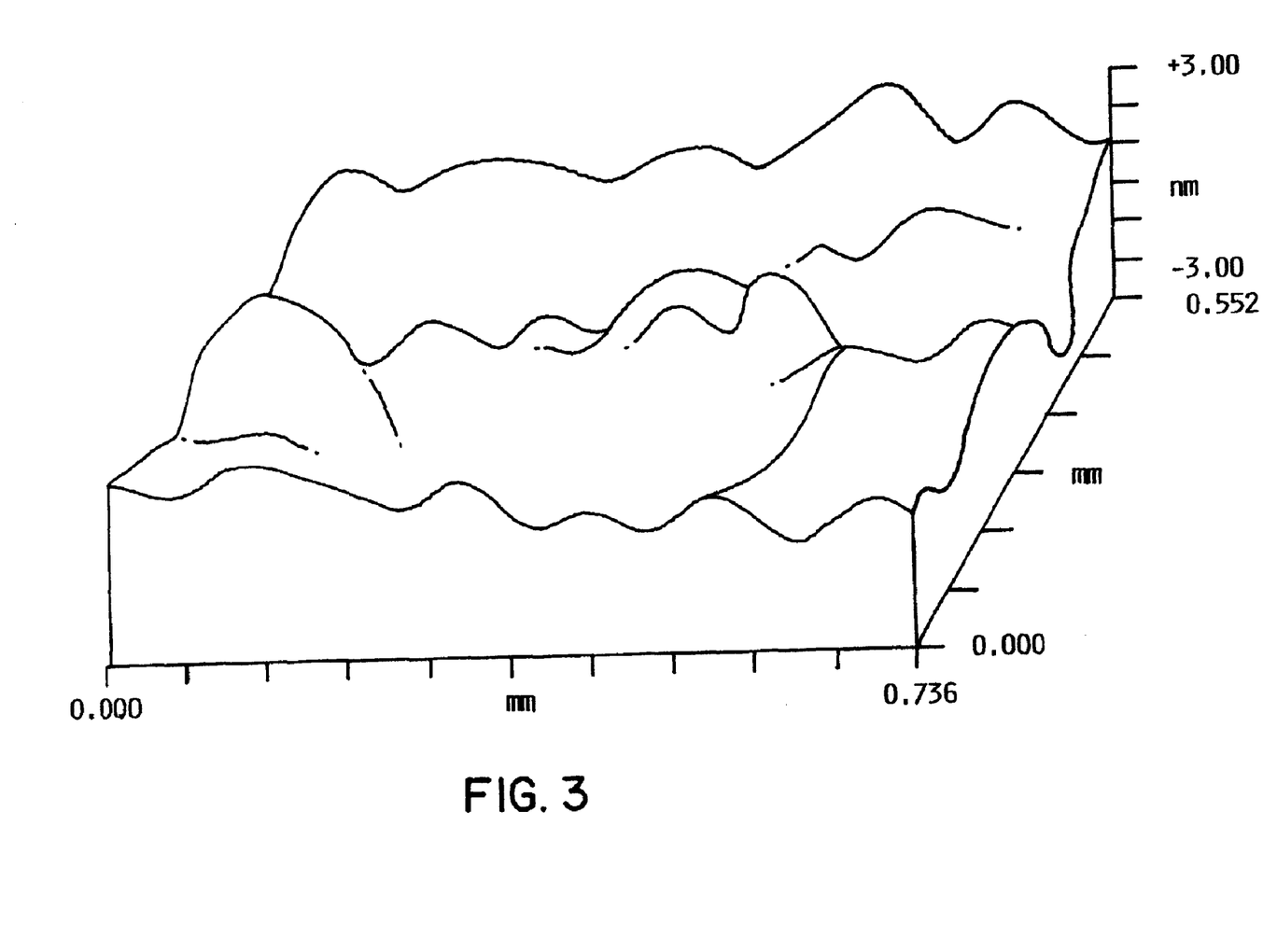
FIG. 3 is a 3-dimensional plot of a small section of a typical disk surface, showing disk microwaviness.

FIG. 3 is a 3-dimensional plot of a small section of a typical disk surface 202 made using a ZYGO™ optical measurement tool, showing disk microwaviness. It will be noted that in the plot of FIG. 3, the z-axis (perpendicular to the disk surface) is on a substantially different scale (nanometers) than the x-axis or y-axis (millimeters). This exaggerates the amplitude of microwaviness in proportion to the wavelength. Without such exaggeration, it would be difficult or impossible to see waviness in the plot. In the plot of FIG. 3, the peak-to-peak amplitude of the microwaviness is on the order of several nanometers, while the wavelength of the microwaviness is on the order of 100 microns, i.e., 100,000 nanometers. These parameters are considered typical of disk microwaviness, it being understood that, depending on the disk materials, finishing processes used, or other factors, these parameters may vary.

Figure 4:
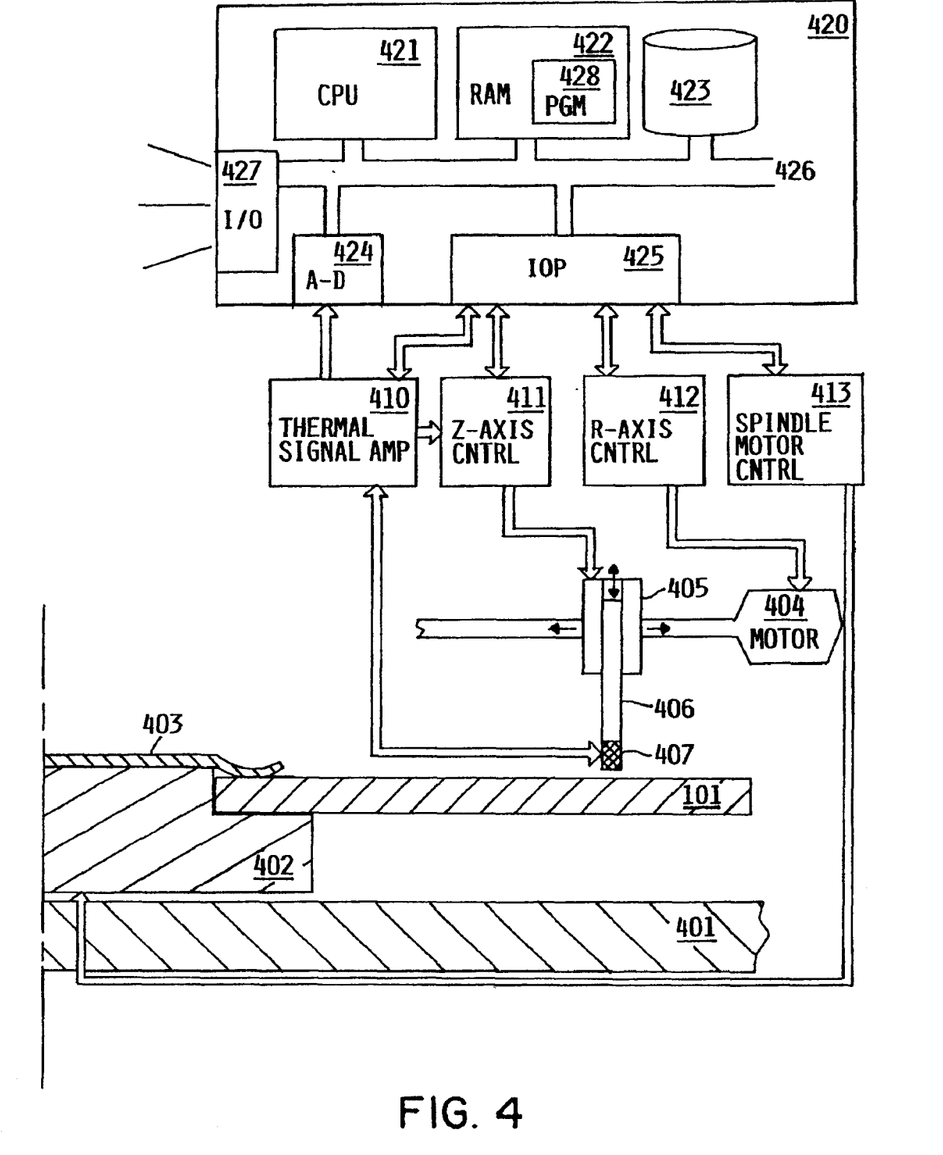
FIG. 4 is a high-level illustration of a test bed apparatus for characterizing a disk surface, according to the preferred embodiment.

FIG. 4 is a high-level illustration of a test bed apparatus for characterizing a disk surface, according to the preferred embodiment. The test bed apparatus includes a stationary frame 401 to which is mounted a spindle motor 402 for rotating disk 101. A clamping mechanism 403 holds the disk in place on the spindle motor. Frame 401, spindle motor 402, clamp 403 and disk 101 are shown in FIG. 4 in partial cross-section in the plane of the axis of rotation, being symmetrical on the other side of the center line.

A thermal sensor 407 is mounted to a moveable suspension 406 from z-axis actuator 405. Z-axis actuator carriage 405 supports movement of sensor 407 in the z-axis, i.e., perpendicular to the plane of disk 101. Z-axis actuator carriage 405 is in turn connected to radial actuator motor 404, which can move the carriage in a direction radial to the disk rotation. Motor 404 is mounted to frame 401 (mounting not shown). Motor 404 may be a linear actuator motor which moves carriage 405 transversely along a substantially straight line, or a rotary actuator motor which rotates carriage 405 through an arc. Motor 404. actuator carriage 405 and suspension 406 thus give sensor 407 two degrees of motion (r-axis and z-axis), permitting the sensor to be positioned over a range of radial distance from the axis and over a range of gap distances above the disk surface.

Spindle motor 402 is rotated under control of spindle motor controller 413, which provides drive current and commutation to the same. Spindle motor controller preferably includes means for determining the current angular position of the disk during rotation. Any of various conventional devices and techniques may be used for this purpose. R-axis controller 412 provides drive current to control r-axis motor 404. Z-axis controller 411 drives z-axis actuator 405 to control the z-axis positioning of sensor 407. The R-axis controller 412 and z-axis controller 411 further include sensors or other means for determining the r-axis and z-axis position of sensor 407.

Thermal signal amplifier and conditioner 410 provides a constant current to sensor 407 for heating the sensor, and provides an analog voltage output to analog-to-digital converter 424 of computer system 420, indicating the drive voltage to sensor 407.

Computer 420 controls the disk surface characterization operation, and specifically controls the operation of thermal signal amp 410, z-axis controller 411, r-axis controller 412 and spindle motor controller 413. Computer 420 is a general purpose computer system having at least one central processing unit (CPU) 421, and a main memory 422 which stores instructions and other data for processing by the CPU. In particular, memory 422 may store a control program 428 for executing the steps of characterizing a disk surface, as more fully described herein. Although control program 428 is shown as residing in main memory 422, it will be understood that such a program typically resides in storage 423 and portions of it are loaded into memory as needed during execution. As shown in FIG. 4, computer 420 further comprises a data storage device 423 such as a rotating magnetic disk drive, an analog-to-digital converter 424 for receiving analog signals from thermal signal amplifier 410, an I/O processor for communicating with the various external units 410-413, and a communications bus 426 for internal communication of data. Computer system 420 further includes one or more I/O controllers (represented generally as feature 427) for handling other forms of I/O, such as input from keyboard, mouse, or other devices, output to a display monitor, output to a printer, communication with other computer systems over any of various communications links, etc. The various components of computer system 420 depicted in FIG. 4 are intended as a high-level illustration only, and it will be understood that a computer system for use as described herein may have other and additional components not shown, that multiple IOPs or other devices may be used for communicating with units 410–413, that some or all of units 410–413 may be internal to computer system 420, or may be integrated into each other, or that any of numerous other variations are possible.

In the preferred embodiment, microwaviness characterization is performed in the same test bed apparatus and substantially concurrently with at least one other disk testing or examination procedure or process step, and specifically, is performed concurrently with glide testing of the disk surface. Glide testing is a procedure intended to determine the existence of local disk surface asperities. Glide testing involves flying a test head over a disk surface while simultaneously rotating the disk in simulated operational conditions. The head contains a sensor (e.g., a piezo-electric shock sensor) which detects collisions with asperities on the disk the surface. As will be appreciated, the disk is therefore mounted on a motorized spindle for rotation. Frame 401, spindle motor 402 and clamp 403 could be used for the glide test as well, provided that a suitable glide test head, suspension and other features are mounted to frame 401. It would be expected that, in this embodiment, computer 420 would control both the characterization of microwaviness described herein and the glide testing. These tests might be performed serially or concurrently, but the disk would be mounted on the spindle once and removed after all applicable tests are performed.

FIG. 4 is intended as a simplified view of a test apparatus, and certain features have been omitted for clarity of illustration. The various glide test head, suspension and other apparatus needed only for supporting glide testing, and not relevant to the characterization of surface microwaviness in accordance with the preferred embodiment, are omitted from FIG. 4 for clarity. Additionally, in the preferred embodiment, a pair assemblies, each comprising a motor 404, carriage 405, suspension 406 and sensor 407, are mounted to frame 401. One assembly of the pair (not shown) is located below the disk and is used for characterizing the lower disk surface, while the other is mounted above the disk and is used for characterizing the upper disk surface. In this manner, both disk surfaces may be characterized without remounting the disk. It would alternatively be possible to place a sensor on only one side of the disk, and to flip the disk to characterize the other side. It would alternatively be possible to perform characterization of only one side of the disk.

Figure 5:
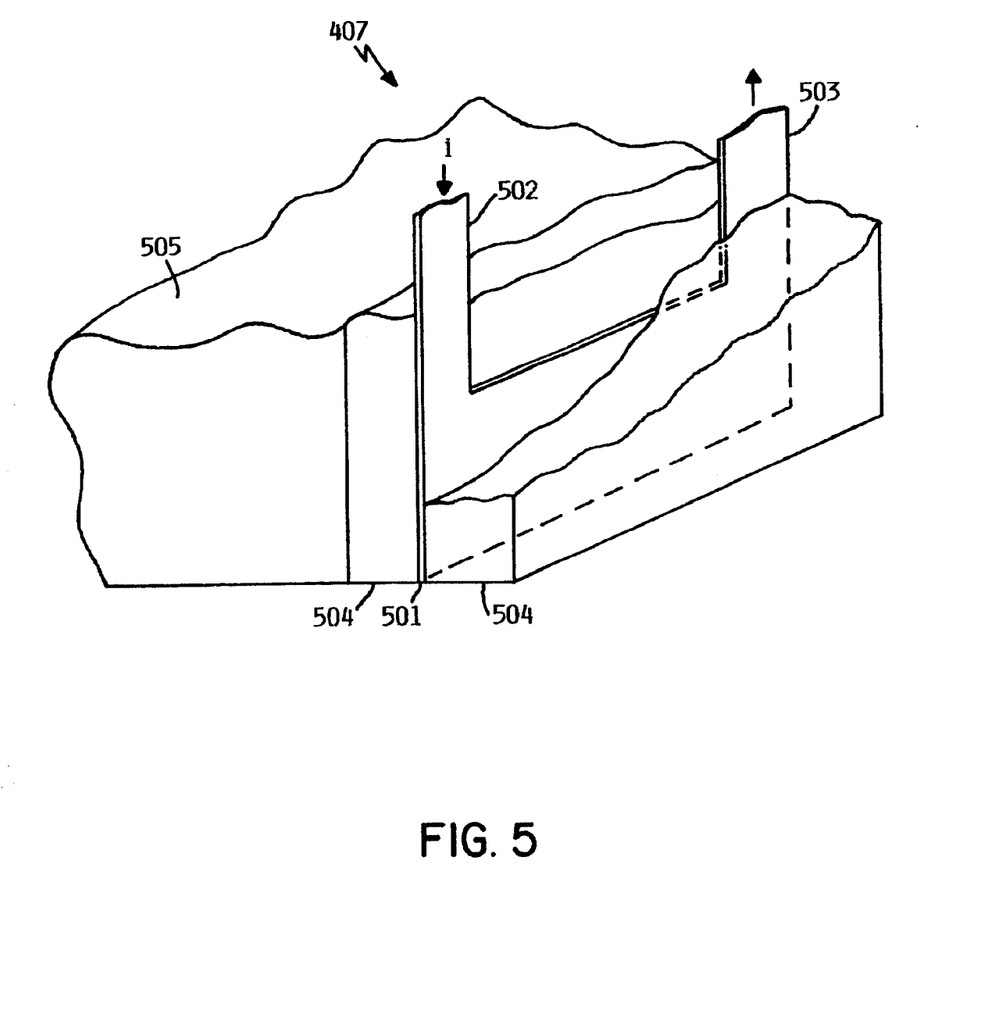
FIG. 5 is a cutaway representation of a sensor for sensing the distance between the sensor and the disk surface, according to the preferred embodiment.

FIG. 5 is a cutaway representation of sensor 407 for sensing the distance between the sensor and the disk surface, according to the preferred embodiment. In the preferred embodiment, sensor 407 is thermal sensor which operates on the principle that heat transfer from the sensor element to the disk is a function of distance between the two. The sensor comprises a thin electrically resistive element 501 having electrical lead connections 502, 503 either end. The sensor is constructed of a material for which electrical resistance varies with temperature. The sensor is surrounded on all sides by a layer of thermally and electrically insulative material (e.g., $SiO_2$) 504, except at the bottom, where it opposes the disk surface. The resistive sensor and insulator are mounted to a mounting block 505 for structural support.

In operation, a constant electrical current is driven through the sensor leads and sensor element, causing its temperature to rise. The temperature of the sensor element rises to some equilibrium in which heat lost to the surrounding environment equals the heat input from the electric current. Because the sensor is surrounded by insulator 504 except where it opposes the disk, most of the heat loss is to the disk surface. In can be demonstrated that this heat loss is related to the distance between the sensor and the disk surface. As this distance varies, the equilibrium temperature of the sensor varies. The variation in sensor temperature causes a variation in resistance, which is detected as a variation voltage drop across the sensor (since the sensor is driven with constant current).

Physically, sensor 407 is similar to a magneto-resistive (MR) or giant magneto-resistive (GMR) read element, and in fact an MR or GMR read element could be used to perform the function of a thermal sensor as herein described, particularly where the sensor is intended to perform other functions as well. Where sensor 407 is used solely as a thermal sensor for characterizing the microwaviness of the surface as described herein, it is not necessary to use a magneto-resistive material, nor is such a material necessarily optimal.

Ideally sensor element 501 is a material having a linear relationship of resistance to temperature over the expected temperature operating range of the sensor. Most metals and many other materials exhibit such a linear variation of resistance with temperature over a known temperature range, i.e.

$$R = R_0 + R_0 \alpha (T - T_0) \tag{1}$$

where $R_0$ is resistance at some reference temperature $T_0$ and $\alpha$ is the temperature coefficient of resistance of the material. For example, platinum and nickel are suitable materials. For metals, α is typically positive, while for semiconductor materials it is usually negative. However, a material with either a positive or negative α could be used. Furthermore, it is not strictly necessary that a material having a resistance which changes linearly with temperature be used. Other mathematical relationships of resistance to temperature can be interpreted using lookup tables or more complex means to determine a temperature from a variation in resistance of the material.

A thermal sensor in accordance with the preferred embodiment changes its temperature (hence its resistance) depending on the spacing between it and the disk surface. From experimentation using magneto-resistive disk transducer heads in disk drive storage devices, it is known that the resistance change is nearly linear with head-to-disk spacing in the range of normal disk flyheight. I.e., as spacing increases, the MR element resistance increases owing to the higher temperature of the MR element, which is in turn a consequence of the thicker air film between the head and disk. The sensitivity of the voltage drop across an MR stripe in response to a change in head to disk spacing when the sensor is operated at constant current can be expressed as:

$$dV/dh=(\alpha/k)R^2I^3 \qquad (2)$$

where k is the thermal conductivity of air. Equation (2) demonstrates the desirability of using thermal sensors having large resistances (R), operating at high currents (I). For example, a typical MR head with $\alpha=3\times10^{-3}$, R=50 ohms, I=6 milliamps, and $k=26\times10^6$ W/m*k gives dV/dh=62 microvolts/nanometer.

Figure 6:
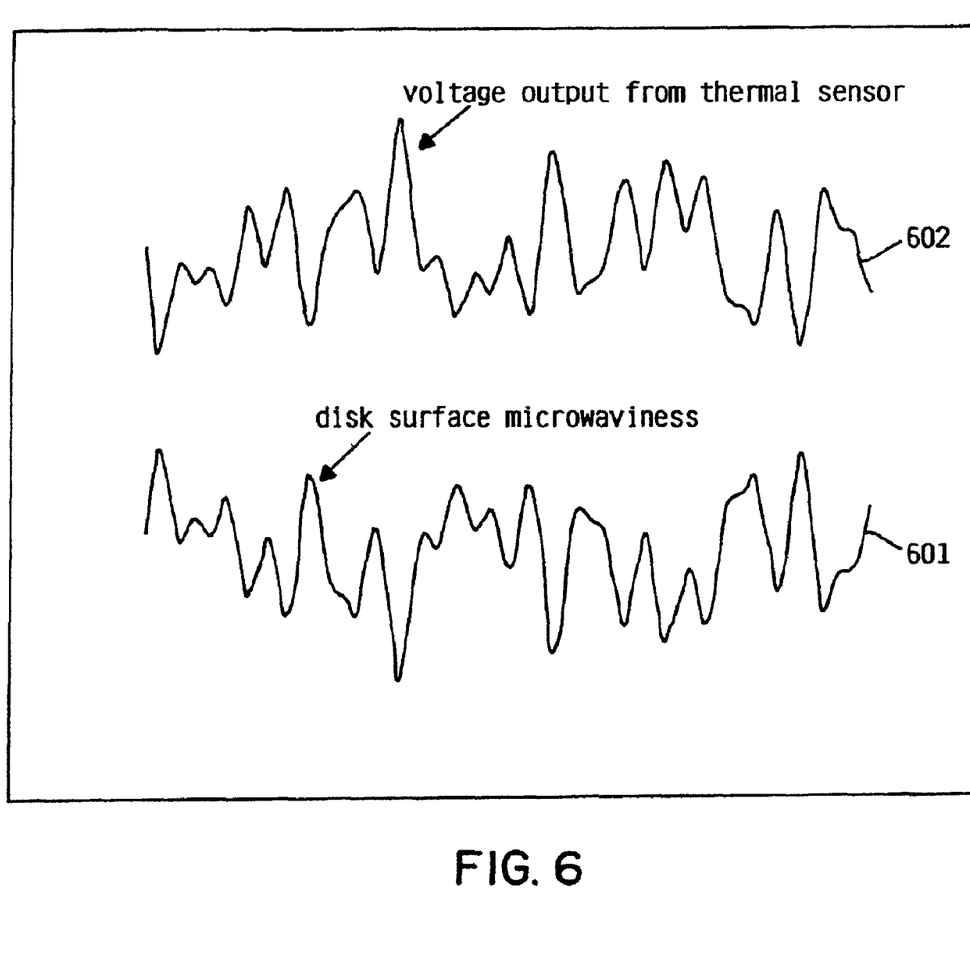
FIG. 6 illustrates a hypothetical voltage response from a thermal sensor to disk microwaviness of a disk surface, according to the preferred embodiment.

FIG. 6 illustrates a hypothetical voltage response from a thermal sensor to disk microwaviness of a disk surface. In FIG. 6, the lower curve 601 represents the disk surface profile as the rotating disk passes under the sensor, i.e., it represents the variation in distance from the sensor to the disk surface. The upper curve 602 represents the voltage drop across the thermal sensor when driven with a constant current. As will be seen, the thermal response (hence voltage) is the inverse of the disk profile. The resistance of the sensor, which may be considered a linear function of temperature, follows the sensor-to-disk spacing up to the thermal cutoff frequency of the sensor. The thermal cutoff frequency is a measure of the speed with which the sensor temperature can change in response to sensor-to-disk spacing changes, which is primarily a function of the mass of the thermal sensor. As a point of reference, current GMR heads have a thermal frequency response from DC to almost 10 MHz, which is more than adequate to sense microwaviness using current operating disk speeds (e.g., around 10,000 RPM). Reducing the disk speed will improve the spatial resolution of the thermal sensor even further. This means that a simpler and cheaper thermal sensor (i.e., other than a GMR head) may be used at reduced disk speeds.

Figure 7:
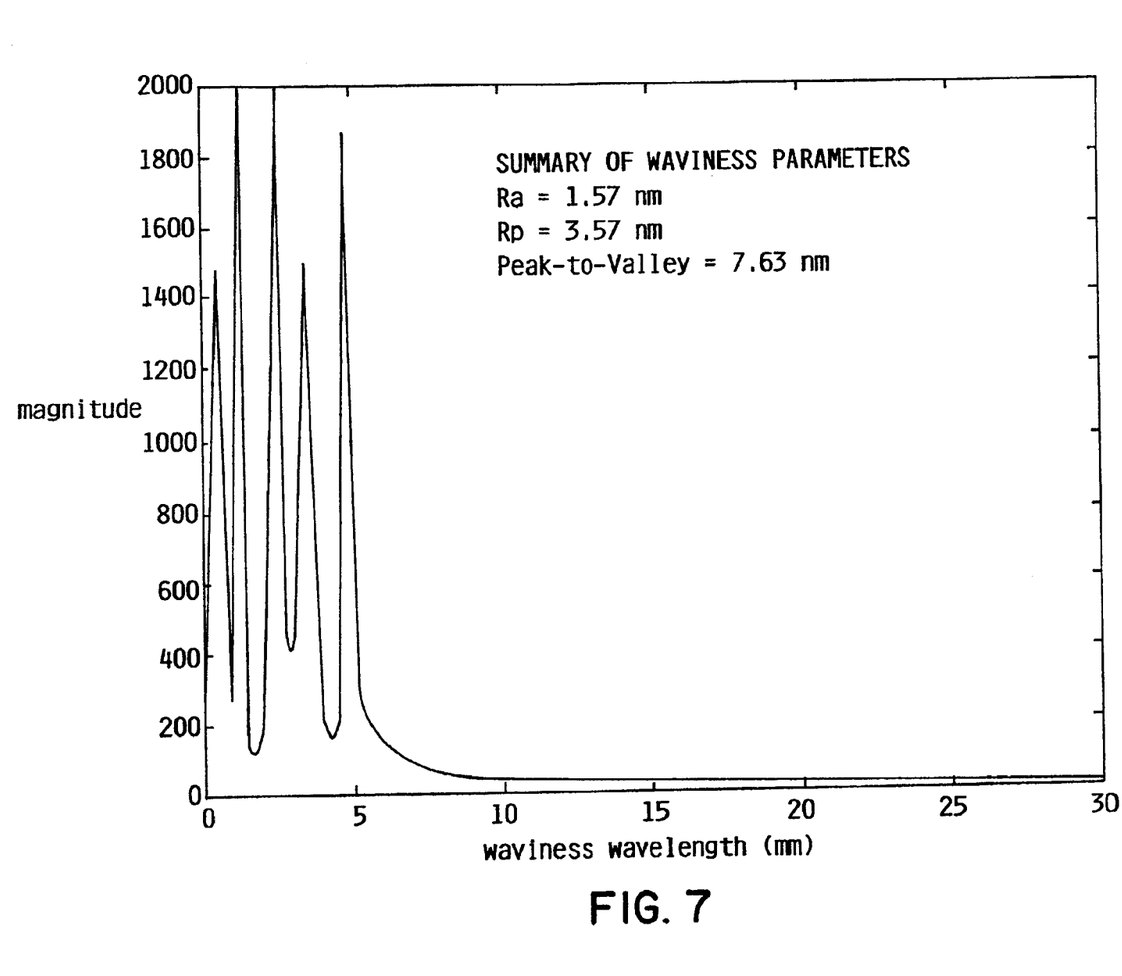
FIG. 7 illustrates a hypothetical plot of microwaviness parameters such as might be extracted from the voltage response of FIG. 6, according to the preferred embodiment.

FIG. 7 shows a hypothetical plot of microwaviness parameters such as might be extracted from the voltage response data of FIG. 6. Preferably, waviness is characterized as an average magnitude of different wavelengths during a complete revolution of the disk. "Average" may be defined as a root-mean-square average, as an arithmetic mean deviation, or as any of various other formulations representing average signal strength over multiple periods. Because the chief problem with microwaviness is the tendency to excite air bearing resonances, the average profile seen over a complete disk revolution is considered the proper measure of this parameter, rather than the disk profile of any local area. I.e., a disk transducer head which encounters only brief local excitation at a particular frequency is not likely to cause resonant response problems. Such a measurement may be performed at multiple radial positions on the disk surface.

In accordance with the preferred embodiment, a disk is formed and then mounted in the fixture represented in FIG. 4. At one or more radial locations, a two stage surface characterization is performed, first by determining the gross warp, and second by following the gross warp profile to determine microwaviness. This process is illustrated in FIG. 8.

Figure 8:
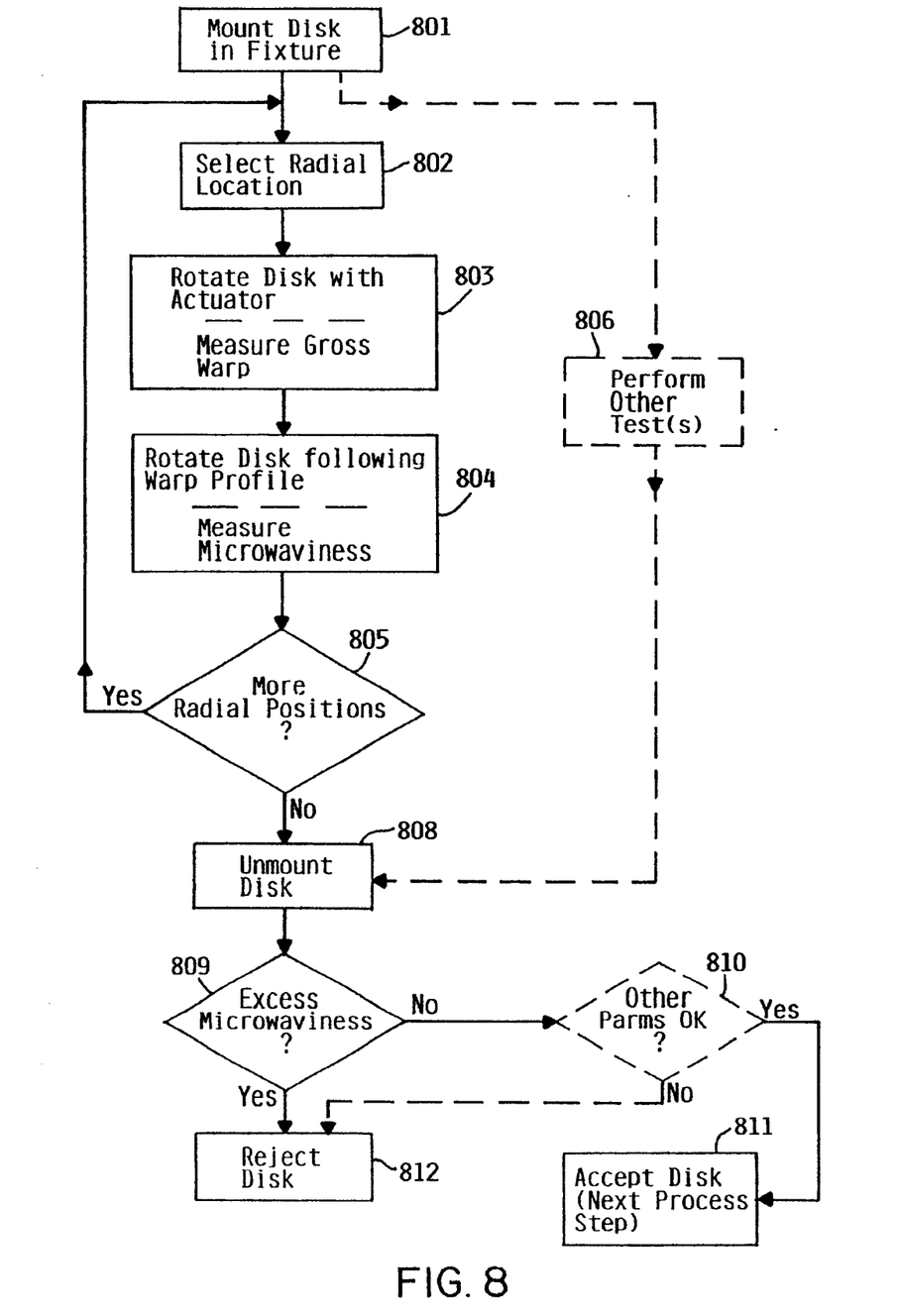
FIG. 8 is a flow diagram showing the different steps in characterizing the surface of a recording disk, according to the preferred embodiment.

The process shown in FIG. 8 would typically be performed after all disk manufacturing steps are performed, such as cutting or forming the substrate, grinding, lapping and/or polishing the substrate, chemical strengthening of the substrate, surface texturing, deposition of magnetic layer, deposition of protective coating layer, various cleaning steps to remove process residues, and so forth. However, surface characterization could be performed at some intermediate stage, before completion of all manufacturing process steps for the disk itself. Surface characterization is preferably performed before installation of the disk into the disk drive, i.e., before the disk is placed on the disk drive spindle for permanent installation; however, it could be performed after such installation; in such case, the test fixture of FIG. 4 would be appropriately modified to measure the surface of an installed disk.

As shown in FIG. 8, the disk is mounted in the test fixture (step 801). Under the control of computer system 420, a radial position for sensor 407 is selected, and motor 404 is engaged to move the actuator carriage 405 to the selected radial position (step 802). The test apparatus then trains itself to follow the gross warp of the disk (step 803) as follows. The spindle motor 402 rotates disk 101 to a desired rotational speed, which may be near the operational speed, but could be significantly less. The sensor 407 is gradually lowered by actuator 405 to near the disk surface, while the resistance is monitored. The actuator 405 attempts to maintain the average temperature of the sensor near some target temperature (indicative of head-to-disk spacing) by raising and lowering the sensor head is actuator, up to a desired mechanical bandwidth. For example, for a disk spinning at 10,000 rpm, the bandwidth of the servo system controlling the spacing might be less than or equal to the $10^{th}$ harmonic of the disk rotational frequency, or 1500 Hz. At these values and for a 3-inch radial distance, surface wavelengths of greater than 20 mm will be tracked. These wavelengths are much longer than microwaviness, but typically short enough to account for most of the gross disk warp.

When the average resistance of the sensor reaches a value corresponding to the desired sensor-to-disk spacing, the actuator ceases to reduce the spacing further, and follows the longer disk surface wavelengths described above indicative of gross disk warp, enabling a measurement of microwaviness (step 804). At this point, the sensor tracks the gross warp of the disk surface as the disk rotates, but in a frequency range well below the frequency range for microwaviness. The resistance of the sensor, however, tracks the higher frequency fluctuations of sensor-to-disk spacing that are associated with microwaviness. By sensing and amplifying these changes in resistance, the microwaviness of the disk surface is characterized.

The two stage process of training the sensor to follow the lower frequency disk profile changes associated with gross warp, and then measuring higher frequency microwaviness changes, is preferred in order to provide a smaller spacing when measuring microwaviness and hence improve the spatial resolution of the measurement. Typically, the amplitude of the lower frequency (gross warp) variations is much larger than the amplitude of microwaviness. While it would be possible to measure both characteristics in a single step, the relatively large amplitude of gross warp would dwarf the smaller microwaviness variations, which would tend to reduce the resolution of the microwaviness measurement.

When a measurement is completed at a particular radial position, the program determines whether additional radial positions should be measured (step 805). If so, another position is selected, and the process repeats (steps 802–804). When all desired radial positions have been characterized, the "N" branch is taken from step 805. It is not strictly necessary that multiple radial positions on the surface be characterized, and in accordance with the present invention it would be possible to characterize the surface at only one radial position. However, because variations in some of the disk processes may cause significantly different microwaviness at different radial positions, it is preferred that at least two positions (near the inner diameter and near the outer diameter) of the disk surface be measured.

As explained previously, in the preferred embodiment the test apparatus may simultaneously or concurrently perform one or more other test procedures on the disk, particularly a glide test. This is represented in FIG. 8 as step 806.

After performing all required tests, the disk is unmounted from the test fixture (808). If microwaviness at any measured radial position exceeds some pre-specified threshold (step 809), the disk is rejected (step 812). If the disk has acceptable microwaviness, but fails some other test (step 810), it may also be rejected. If the disk passes all applicable tests, it is accepted for installation into a disk drive (step 811), and the next process step, such as installation on the spindle of a disk drive, is performed.

Because the sensor of the preferred embodiment directly measures changes in voltage due to changes in resistance, which are in turn caused by changes in sensor temperature, which are in turn caused by changes in the distance between sensor and disk surface, any number of factors may influence the sensor output. Mechanical impacts due to mishandling, exposure to chemicals, accumulation of dirt or debris, and numerous other events might alter the sensor response. It is therefore preferred that the sensor be calibrated upon initial installation of the test fixture, and periodically thereafter. For example, the sensor might be re-calibrated after an elapse of time, or after a predetermined number of disk surfaces (e.g. 100) have been tested. The sensor should also be re-calibrated any time there is an indication of an event, such as a mechanical impact, which might affect the sensor output. It would be possible to calibrate the sensor before each disk measurement, but this is probably unnecessary for most manufacturing environments.

Any number of calibration methods are possible. A simple exemplary method is described herein, it being understood that other methods could be used consistent with the present invention. A difference in measured voltage at two different sensor positions in the z-axis gives a $\Delta V$. A separate z-axis position sensor (not shown), which measures position of sensor 407 in the z-axis, can be used to determine the height difference between the different measurement positions ($\Delta h$). The sensor output is initially measured at two or more z-axis positions near the disk surface with a disk surface at rest. By not spinning the disk, damage to the sensor or disk is avoided or minimized in the event that the sensor contacts the disk. I.e., it may be that the sensor output is so poor that the sensor will be lowered onto the disk surface before realizing that something is awry; in this event, a disk at rest is not as likely to damage the sensor or disk. These measurements give an approximate dV/dh based on static conditions. The actual dynamic dV/dh will vary because air currents induced by the spinning disk affect the rate of heat transfer. The disk is then rotated at the speed at which disk surfaces are to be measured, and the sensor slowly brought near the disk surface to repeat the measurements at two different positions near the surface. For purposes of these measurements, the average voltage output of the sensor over an extended period (such as a full disk revolution) is used. This second set of measurements gives a dV/dh near the disk surface under dynamic conditions, and the sensor is therefore calibrated.

In the preferred embodiment, sensor 407 is a thermal sensor which detects sensor-to-disk spacing as a variation in electrical resistance caused by thermal variation due to change in heat transferred across the air gap from the sensor to the disk. However, many different types of sensors could be used to determine a sensor-to-disk spacing in accordance with the present invention, and the present invention is not necessarily limited to any single sensor technology. For example, inductive, capacitive, optical, magnetic and other types of sensor could be used. Some of these types of sensors might not require calibration, or might require calibration under different circumstances and procedures.

Although a specific embodiment of the invention has been disclosed along with certain alternatives, it will be recognized by those skilled in the art that additional variations in form and detail may be made within the scope of the following claims:

What is claimed is:

1. A method for manufacturing a disk for a rotating disk drive data storage device, comprising the steps of:

forming a disk for use in a disk drive data storage device, said disk having at least one data recording surface;

characterizing microwaviness of said data recording surface of said disk by mounting said disk in a test fixture for characterizing microwaviness;

characterizing warp of said disk with a sensor that is mounted to a carriage, the carriage being positionable along both an r-axis and a z-axis, the r-axis extending radially from a rotational axis of the disk, and the z-axis being perpendicular to said data recording surface;

simultaneously rotating said disk and moving the carriage and the sensor relative to the z-axis to maintain a substantially constant distance between said sensor and said data recording surface, and relative to the r-axis; and characterizing microwaviness of said data recording surface using said sensor, while performing said step of simultaneously rotating said disk and moving the carriage and the sensor; and rejecting said disk for use in a disk drive data storage device if said microwaviness exceeds a pre-determined limit.

2. The method for manufacturing a disk of claim 1, wherein said step of characterizing microwaviness is performed before assembly of said disk into a disk drive storage device.

3. The method for manufacturing a disk of claim 1, wherein said step of characterizing microwaviness of said data recording surface comprises measuring a height profile of said surface using a thermal sensor which senses a change in distance as a change in heat transfer between the sensor and the disk.

4. The method for manufacturing a disk of claim 1, wherein said step of characterizing microwaviness of said data recording surface comprises measuring microwaviness at a plurality of radial locations of said disk.

5. The method for manufacturing a disk of claim 1, wherein said text fixture further performs a glide test of said disk while said disk is mounted in said test fixture.

6. A method for characterizing a disk surface of a disk for a disk drive data storage device, comprising the steps of:

rotatably mounting said disk in a measurement fixture, said measurement fixture having a sensor positionable in a z-axis, said z-axis being perpendicular to said disk surface, said sensor being capable of measuring a distance between the sensor and a disk surface;

characterizing warp of said disk with said sensor at a plurality of circumferentially spaced locations of said disk;

simultaneously rotating said disk and moving said sensor in said z-axis to maintain a substantially constant distance between said sensor and said disk surface; and characterizing microwaviness of said disk surface using said sensor, while performing said step of simultaneously rotating said disk and moving said sensor in said z-axis.

7. The method for characterizing a disk surface of claim 6, wherein said sensor comprises a thermal sensor which senses a change in distance as a change in heat transfer between the sensor and the disk.

8. The method for characterizing a disk surface of claim 7, wherein said sensor is calibrated by measuring voltage output at a plurality of z-axis positions of said sensor.

9. The method for characterizing a disk surface of claim 6, wherein said sensor is further positionable on said measurement fixture in an r-axis, said r-axis being substantially radial to the axis of rotation of said disk, and wherein said steps of characterizing warp, simultaneously rotating said disk and moving said sensor in said z5 axis, and characterizing microwaviness of said disk surface using said sensor, are performed at a plurality of radial locations of said disk.

10. An apparatus for characterizing a disk surface of a disk for a disk drive data storage device, comprising:

a rotatable disk mounting driven by a spin motor, said rotatable disk mounting receiving a disk to be characterized;

a frame having a movable suspension with a carriage mounted thereto, and a z-axis actuator for moving the carriage linearly alone a z-axis that is perpendicular to the disk surface to maintain a substantially constant distance between said sensor and said disk surface;

a sensor mounted to the carriage and positionable along the z-axis with the carriage, said sensor being capable of measuring a distance between the sensor and the disk surface;

a control program which simultaneously rotates said disk using said spin motor and moves the carriage and sensor relative to the z-axis while characterizing microwaviness of said disk surface using said sensor.

11. The apparatus for characterizing a disk surface of claim 10, wherein said control program causes said apparatus to:

move the carriage and the sensor with a radial actuator alone an r-axis that extends in a radial direction from a rotational axis of the disk;

characterize warp of said disk with said sensor at a plurality of circumferentially spaced locations of said disk;

simultaneously rotate said disk and move said sensor relative to the r-axis; and characterize microwaviness of said disk surface using said sensor, while simultaneously rotating said disk and moving said sensor relative to the r-axis.

12. The apparatus for characterizing a disk surface of claim 10, wherein said sensor comprises a thermal sensor which senses a change in distance as a change in heat transfer between the sensor and the disk.

13. The apparatus for characterizing a disk surface of claim 10, wherein said apparatus further comprises means for performing a glide test of said disk while said disk is mounted in a test fixture.

* * * * *